United States Patent [19]

Winger

[11] Patent Number: 5,154,731
[45] Date of Patent: Oct. 13, 1992

[54] SEPARATOR FOR ELECTROCHEMICAL CELL AND PROCESS FOR ASSEMBLING IT INTO THE CELL

[75] Inventor: Jerrold Winger, Elyria, Ohio

[73] Assignee: Eveready Battery Company, Inc., St. Louis, Mich.

[21] Appl. No.: 594,525

[22] Filed: Oct. 9, 1990

[51] Int. Cl.⁵ .............................................. H01M 6/00
[52] U.S. Cl. ...................................... 29/623.2; 29/731
[58] Field of Search ............... 429/133, 164, 136, 140, 429/142; 29/623.2, 623.5, 623.1, 730, 731

[56] References Cited

U.S. PATENT DOCUMENTS

| | | | |
|---|---|---|---|
| 3,089,914 | 5/1960 | Carmichael et al. | 136/143 |
| 3,097,975 | 7/1963 | Horn et al. | 136/145 |
| 3,748,181 | 7/1973 | Alberto | 136/107 |
| 4,220,693 | 9/1980 | Di Palma et al. | 429/133 |
| 4,618,546 | 10/1986 | Simonton et al. | 429/133 |

FOREIGN PATENT DOCUMENTS

| | | |
|---|---|---|
| 993948 | 7/1976 | Canada . |
| 2181594 | 9/1986 | United Kingdom . |

*Primary Examiner*—Anthony Skapars
*Attorney, Agent, or Firm*—Robert W. Welsh

[57] ABSTRACT

An electrochemical cell, such as an alkaline cell, employing at least two separator strips in which the strips have notches appropriately placed so that when the separator is formed into a closed end cylindrical configuration it will have substantially no folds protruding inside and or outside its wall at the area adjacent its bottom surface.

9 Claims, 1 Drawing Sheet

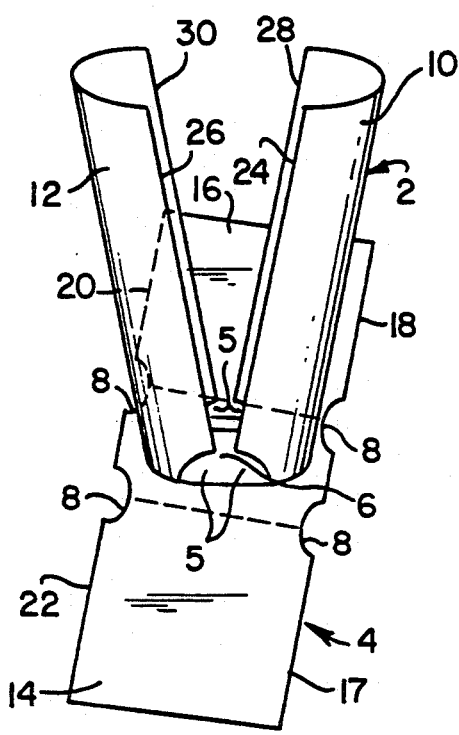
FIG. 1
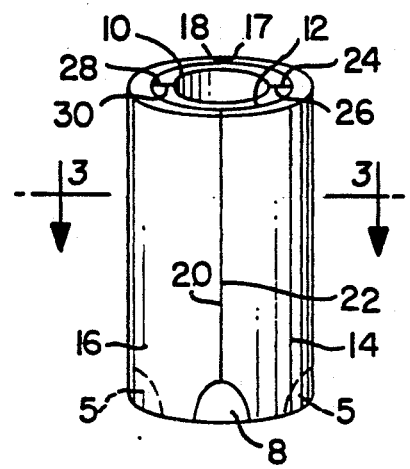
FIG. 2
FIG. 3
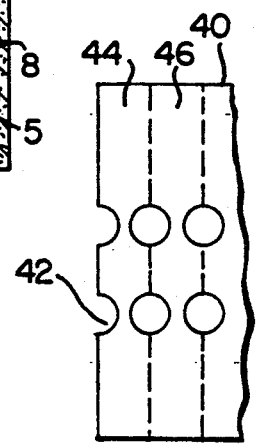
FIG. 4
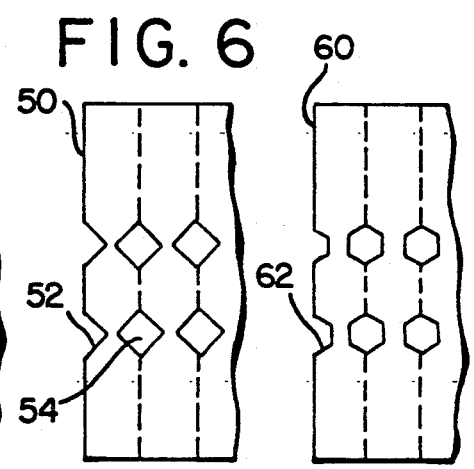
FIG. 5  FIG. 6  FIG. 7

SEPARATOR FOR ELECTROCHEMICAL CELL AND PROCESS FOR ASSEMBLING IT INTO THE CELL

FIELD OF THE INVENTION

The invention relates to electrochemical cells, such as alkaline cells, which employ a tubular separator closed at one end which is composed of at least two separator strips each having a bottom segment and extending sidewalls with the bottom segment of one strip superimposed on the bottom segment of the other strip and wherein notches are formed in the edges of the strip adjacent the bottom segment to substantially eliminate the usual projected folds in the edges of the strip that are formed when the strips are assembled into a substantially circular container having an open end. The invention also relates to a process for assembling the separator in the cell.

BACKGROUND OF THE INVENTION

The subject invention is primarily suited for use with alkaline type cells. Standard alkaline cells are conventionally manufactured with a cathode which generally comprises predominantly an oxide depolarizer, such as manganese dioxide usually admixed with a binder and conductive material such as graphite and the like. The cathode is generally pressed firmly against the inside wall of a container with the inner portion of the cathode left hollow so that the cathode assumes a closed end cylindrical structure with a centrally defined cavity. Separator material, usually formed into thin sheets of paper-like material, is inserted into the cathode's central cavity and conforms to the cavity of the cathode. An anode which usually comprises a consumable anodic material such as powder zinc admixed with a gelling agent such as polyacrylic acid or carboxymethyl cellulose and a suitable alkaline electrolyte such as an aqueous potassium hydroxide solution, is then extruded into the cavity of the separator. Thus the sheets of separator material electrically isolates the anode from the cathode while simultaneously permitting ions to flow between the electrodes. Generally, the separator strips can be forced downward and through the cathode's central cavity so that the separator's center region is parallel with and close to the bottom of the container. Occasionally, the insertion of the separator, using a rod driving means, forces the center region of the separator into the cathode material at the bottom of the container. On occasions, small pieces of the cathode are driven into and partially through the separator. This can result in short circuit of the anode and cathode of the cell thus rendering the cell useless. In addition, sometimes during discharge of the cell, zinc dendrites are formed that can extend through the separator at the bottom region of the container and short circuit the cell. These problems are difficult to detect because the cell would have to be disassembled in order to inspect the bottom central portion of the separator for evidence of cathode mix penetration or dendrite penetration. However, this problem has been substantially eliminated by placing an electrically insulating barrier, such as a plastic film, on the bottom surface of the separator. The use of an electrically insulating barrier at the bottom surface of the separator is disclosed in copending patent application number U.S. Pat. No. 560,651 by Kelemen et al filed on July 30, 1990.

British Patent 2,181,584 describes a method of producing a separator basket for standard alkaline batteries. This process uses a mandrel to form and support a tube of separator material on which the separator material is folded over one end of the tube and then a small amount of sealant is dispensed on the outside surface of the folded over bottom of the separator to form a "basket". The sealant seals the end of the separator basket and in some applications may secure the separator to other cell components such as the cathode. A final step may include insertion of a can containing a molded cathode over the mandrel-supported separator.

However, there is a problem associated with using strips of separator material to form a separator basket to be used in cylindrical type alkaline cells. Specifically, one problem in this type of basket separator is that undesirable folds are formed in the separator strips near the bottom segment of the basket. These projected folds or protrusions are inherent to a process of forming a retaining basket or cavity by inserting two rectangularly shaped strips of material into a circular opening so that the strip segments are aligned and symmetrically positioned within a tubular shaped electrode (cathode). The undesirable folds occur where the inner most surface of the separator contacts the bottom area of the electrode. These protrusions of folded material, commonly referred to as "ears", may extend to the inside and/or outside of the separator basket. These protrusions are an unavoidable part of a process which forces strips of uniform width into a circular type opening whose inside diameter is less than the width of the strips.

At least two problems can be caused by the presence of these protrusions. In alkaline cells, if the anode mix flows into the gaps or folds of the protrusions, the zinc in the anode may work its way between the strips and eventually cause an electrical short within the cell. The second problem pertains to folds in the separator that protrude into the retaining cavity thereby preventing the anode from falling to the bottom of the retaining cavity. This problem can force the trailing end of the anode to project above the top of the cathode and thereby create a situation in which the anode can be easily smeared onto the cathode during the remainder of the cell assembly process. In addition, the removal of the excess protrusion material will permit more active material to be placed into the cell and thereby provide greater output capacity.

It is an object of the present invention to provide a separator basket for electrochemical cells that is made from separator strips of material and wherein said separator basket has no effective protrusions or folds thereby providing a more uniform cavity.

It is another object of the present invention to provide a separator basket made from rectangular strips of material which have notches appropriately formed in the edges of the strips so that the strips upon being assembled to form a separator basket will effectively be free of any undesirable folds protruding from the wall of the basket.

It is another object of the present invention to provide a separator basket that is easy to make and cost effective to produce.

It is another object of the present invention to provide a process for assembling the separator basket into a cell.

These and other objects and advantages of the invention will be apparent from the following description and drawings.

SUMMARY OF THE INVENTION

The invention relates to an electrochemical cell assembled in a housing comprising a container having a closed end and an open end closed by a cover; a first active electrode material positioned within and contacting the inner wall of the container and defining a centrally disposed cavity; a separator comprising at least two separator strips with each strip having a bottom segment with extending walls and each wall being defined by two edges; the bottom segment of one strip superimposed on the bottom segment of the other strip with the extending walls of each strip arranged to face the edges of the walls of the other strip so that the walls define a cavity in said separator and wherein each edge of at least one strip has a notch formed in the area of the edge adjacent the bottom segment of the strip to substantially eliminate the usual projected folds in the edge of the strip formed at said area; said separator positioned within and contacting said first active electrode material; a second active electrode material positioned within said cavity of the separator; a first terminal on the housing electrically connected to said first active electrode material; and a second terminal on the housing electrically insulated from the first terminal and electrically connected to said second active electrode material. The area of the bottom segment should preferably be approximately the area of the cross-section of the cavity of the first electrode.

A preferred embodiment of the invention is an electrochemical cell assembled in a housing comprising a cylindrical container having a closed end and an open end closed by a cover; a first active electrode material positioned within and contacting the inner wall of the container and defining a centrally disposed cavity; a separator comprising at least two elongated separator strips defined by two spaced apart elongated edges with each edge having two spaced apart notches in which the area formed in each strip by the length of the edge between the spaced apart notches and the width between the spaced apart edges define a bottom segment and in which the length of the edge extending from each notch and the width between the spaced apart edges defines a wall; the bottom segment of one strip abutting on the bottom segment of the other strip and the walls of each strip extended substantially perpendicular to the bottom segment with the edges of each wall of a strip superimposed on the edge of a wall of the other strip thereby forming a substantially circular cavity in the separator, the notches provide space so that the usual projected folds in the edges of the strips formed at said area of the separator adjacent the bottom segment when the strips are folded into a substantially circular cavity will be substantially eliminated; said separator positioned within and contacting said first active electrode material; a second active electrode material positioned within said cavity of the separator; a first terminal on the housing electrically connected to said first active electrode material; and a second terminal on the housing electrically insulated from the first terminal and electrically connected to said second active electrode material.

The invention also relates to a process for assembling a cell using the separator of this invention which comprises the steps:

(a) positioning the first active electrode material, such as a cathode, inside a container closed at the bottom and open at the top so that the first active electrode material defines a centrally disposed cavity, said container being adapted as the terminal for said first active electrode material;

(b) preparing a first strip and a second strip of separator material with two spaced apart notches in each of the edges of the strips; said notches in each edge being spaced apart sufficiently so that the distance between the notches is not substantially greater than the maximum diameter of the cavity in the first active electrode material;

(c) forcing said first strip of separator material and said second strip of separator material into the cavity of the first active electrode material and forcing the strips to assume the contour of the cavity of the first electrode material; said first strip being positioned with respect to said second strip to form within said first electrode a separator basket which has effectively no projected folds at the area adjacent to the bottom of the separator basket;

(d) adding a second active electrode material into the cavity of the separator material; and (e) sealing the open end of the container with a cover and wherein at least a portion of the cover is electrically insulated from the container and electrically contacting said second active electrode material thereby said portion being adapted as the terminal for the second active electrode material.

Preferably the first strip should be positioned about 90° with respect to the second strip and the notches in the first strip superimposed over the notches in the second strip as to form the separator basket.

The subject invention is designed to prevent the problems associated with the formation of undesirable folds in the separator basket. The basic concept is to modify the separator strips by cutting out small portions of the strips prior to inserting the strips into the cathode. Modification of the strips includes cutting out small pieces of the separators or imparting slits to the strips at those locations where the folds of the separator create the ears. Preferably, each separator strip should be notched at least once on each of its longest sides. These notches can be made in a variety of shapes and sizes such as a slit, a semi-circular notch, a triangular notch, or any polygonal shaped notch. The primary criteria to be met are: (1) substantially eliminate any ears within the retaining cavity after the separator basket has been formed; and (2) there are no direct openings in the separator basket through which the anode can migrate.

If desired a cup shaped piece of material, such as paper, can be inserted into the bottom of the separator basket after the separators have been inserted into the cathode. This cup will serve as a backup means to insure than anode mix does not work its way through any gaps that might inadvertently be formed between the edges of the separator sheets.

If also desired, an electrically insulating barrier layer could be positioned on the surface of at least one of the bottom surfaces of the separator basket to prevent internal shorting between the electrodes. Suitable electrically insulating barrier layer materials would include polypropylene, polyethylene, polyvinyl chloride, asphalt, wax, polyvinylidene chloride, cellophane and nylon. The electrically insulating barrier layer could also comprise a film or strip having an adhesive on one of its surfaces so that it could be secured to a selected area (bottom segment) of a separator strip. If the electrically insulating barrier material is a two sided type adhesive tape, then it could be disposed between the bottom segments of the separator strips thereby keeping them secured during the assembly process. If the electrically insulating barrier material is plastic, then it could be attached to the bottom surface of a separator strip using heat to laminate the plastic to the separator or the plastic could be extruded directly onto the separator. In all embodiments, the electrically insulating barrier material could provide effective protection against piercing of the bottom segment of the separator by small bits of active electrode material to prevent the development of an internal electrical short circuit.

Preferably, the first active electrode material would be the cathode material comprising a depolarizer such as manganese dioxide usually mixed with a binder and conductive material such as graphite, acetylene black or mixtures thereof. Preferably, the second active electrode material would be an anode comprising zinc admixed with a gelling agent and a suitable alkaline electrolyte such as aqueous potassium hydroxide solution. Anode materials and their preparation are described in U.S. Pat. Nos. 2,930,064, 2,935,547 and 2,993,947. The disclosure of these references is incorporated herein as if they were presented in their entirety.

The separator of this invention may be composed of any separator material such as woven or non-woven paper of cellulose fibers laminated to a similar mat of vinyl fibers, kraft paper, alpha cellulose paper, methyl cellulose film, polyvinyl alcohol, copolymers of polyvinyl acetate and polyvinyl chloride, rayon, nylon, and mixtures thereof.

BRIEF DESCRIPTION OF THE DRAWINGS

FIG. 1 is a perspective view of two separator strips with spaced apart notches showing the first strip superimposed over and folded upward on a second strip which is positioned 90° to the first strip so that only the central areas overlap.

FIG. 2 is a perspective view of the two separator strips after all the non-overlapping segments (walls) of the strips are folded normal to the plane of the overlapping area of the strips and curved inward to form a closed end cylindrical configuration.

FIG. 3 is a cross-sectional view of FIG. taken through line 3—3.

FIG. 4 is a sectional view of the separator of FIG. 2 positioned within the cavity of a cylindrically constructed cathode.

FIG. 5 is a top view of a sheet of separator material having a series of spaced apart circular notches formed at the middle area of the sheet.

FIG. 6 is a top view of a sheet of separator material having a series of spaced apart square notches formed at the middle area of the sheet.

FIG. 7 is a top view of a sheet of separator material having a series of spaced apart polygonal notches formed at the middle area of the sheet.

FIG. 1 shows a first strip of separator material 2 having walls 10 and 12 positioned under and rotated 90° on a second strip of separator material 4 having walls 14 and 16 so that overlapping occurs only in area 6. Strip 2 has two spaced apart semi-circular notches 5 formed in each edge 24-26 and edge 28-30 and strip 4 has two spaced apart notches 8 formed in each edge 17-18 and edge 20-22. The notches of strip 2 are initially placed over the notches of strip 4. FIG. 1 shows strip 2 partially folded upward so that edges 24 and 28 approach edges 26 and 30, respectively. As shown in FIG. 2, when projecting the separator strips into a circular cavity of a cathode lined container, walls 10 and 12 of strip 2 would be bent normal to area 6 forming a circular configuration with walls 14 and 16 of strip 4. The notches 5 and 8 formed in the sheets 2 and 4 respectively, will provide space for the folded strip material and will effectively eliminate the undesirable folds or protrusions normally formed at the area adjacent the bottom surface 6 at the mating edges of the walls. The forming of notches 5 and 8 in strips 2 and 4, respectively, will provide for a more uniform cylindrically shaped separator basket and eliminate any protrusion of the strip materials in the cavity formed in the basket which could prevent the anode from falling to the bottom of the basket. By folding walls 10 and 12 of strip 2 and walls 14 and 16 of strip 4, a cylindrical configuration is produced as shown in FIGS. 2 and 3. This cylindrical configuration would conform more uniformly to the interior of the cathode pressed firmly against the inside wall of a cell's container. As evident from FIGS. 2 and 3, wall 14 faces edges 24 of wall 10 and edge 26 of wall 12; wall 16 faces edges 28 of wall 10 and edge 30 of wall 12; wall 12 faces edge 20 of wall 16 and edge 22 of wall 14; and wall 10 faces edge 18 of wall 16 and edge 17 of wall 14. Thus the separator strips 2 and 4 are folded during insertion into a cylindrical cavity of the cathode and conform to the shape of the cylindrical cavity. As shown in FIG. 4, the overlapping or bottom area 6 is positioned at the bottom of the cylindrical cavity of the cathode 32 in contact with the bottom inner surface 34 of cathode 32.

Although the edges of the walls (24-26; 28-30; 17-18; and 20-22) of the separator strips are shown abutting to provide a circular cylindrical configuration, in reality the edges usually overlap to form an irregular cylindrical configuration that is substantially free of folds protruding at the area adjacent the bottom of the basket. In some applications, the edges may be separated and still provide an overall irregular configuration that can be used in some cell applications. The only requirement is that the separator strips provide a cylindrical type basket having an overall upstanding wall that is completely closed so that the cathode is not in direct contact with the anode in any area of the separator.

FIG. 5 shows a sheet of separator material 0 having a series of spaced apart semi-circular notches 42 formed at its midsection. Sheet 40 could be cut into strips 44, 46 etc. as shown by the broken lines to provide a strip 44 that could be used as one of the strips shown in FIG. 1. If desired two such strips 44, 46 could be used as shown in FIG. 1. FIG. 6 shows a similar sheet of separator material 50 except that the notches are spaced apart triangular shaped notches 52 formed from diamond shaped cutouts 54. FIG. 7 shows a similar sheet of separator material 60 except that the notches are spaced-apart polygonal shaped notches 62. As discussed above any shape notch would be suitable as long as it provides a means for substantially eliminating the normal folds protruding from the area adjacent the bottom of the separator basket.

A standard alkaline cell can be produced by preparing a quantity of powdered cathode material and disposing it into the open end of a cylindrical container. A molding ram is then pressed into the powdered mixture that is contained within the container and since the ram's outside diameter is substantially smaller than the inside diameter of the can, an elongated "ring" of cathode mix is molded tightly against the container's interior circumference. After the ram is withdrawn, a tubular shaped cavity is formed into the central portion of the cathode. Two strips of a separator material with suitable disposed notches are inserted into the cathode's centrally located cavity in order to form a separator basket. An electrolyte and a gel-like anode are dispensed into the separator basket and then a seal assembly is inserted into the open end of the container. This assembly includes an elongated current collector that projects into the anode and also includes a plastic disc-shaped seal that fits tightly within the container's opening and is seated slightly below the top of the container. The top of the container is redrawn until the seal is radially compressed and then the lip of the container is crimped inwardly.

A preferred separator insertion process for standard alkaline cells would utilize two strip-shaped pieces of separator material with appropriate notches. The first step in the separator insertion process involves cutting a first strip of separator to an appropriate length and width with suitable notches. The length should be equal to at least twice the cathode's height plus the inside diameter of the cathode. The width of the strip should be slightly greater than one-half the cathode's inside circumference. Next, the first strip is positioned over the open end of a container that contains a molded cathode. The strip's broad surfaces must be perpendicular to the cathode's longest dimension and the center point of the separator must align with the cathode's longitudinal axis. A rod-shaped separator insertion ram is positioned above the open end of the container. The rod's outside diameter should be slightly smaller than the inside diameter of the cathode's cavity and the circumference of the ram should be concentric with the circumference of the cathode's cavity. As the ram descends it carries the middle portion of the separator downward into the cathode's central cavity until the separator touches the inside bottom of the cathode. The two walls of the separator strip that extend beyond the separator's central region extend upward from the bottom of the cathode and line the cathode's sidewalls. The surface of the first strip that contacts the cathode is known as the outside surface of the first strip while the opposite side of the separator is known as the inside surface of the first strip. A second strip of separator is cut to the correct length and width. The central portion of the second strip is positioned over the open end of the cathode that already contains the first separator strip. When the second strip is positioned above the container, it is rotated so that after the second strip is inserted into the container, the seams of the second strip are turned ninety degrees relative to the seams in the inserted first separator strip. This rotational offset seam arrangement inhibits particles of zinc in the anode mix that could otherwise work their way through the seams of both separators and thereby create an internal short circuit. After the second strip has been properly located, another rod-shaped insertion ram is positioned above the cathode and concentrically aligned with the inside diameter of the cathode's cavity. The second separator insertion ram descends and inserts the second separator strip inside the previously inserted first separator strip. The walls of the second separator extend upward from the bottom of the cathode and line the inside surface of the first separator. The surface of the second separator that contacts the inner surface of the first separator is known as the outside surface of the second separator. The other surface of the second separator faces the longitudinal axis of the cathode's cavity and is known as the inside surface of the second separator.

An efficient and reliable separator insertion process is generally critical to the production of standard alkaline batteries on a continuous basis. The separator should be consistently inserted to the bottom of the cathode's cavity at the high speeds required by mass production processes and this must be done without abusing the separator. The proposed invention is specifically designed to solve the problem of folds in the formed separator basket from protruding inside and/or outside the walls of the cavity formed by the separator. This will allow the anode mix to be easily inserted into the separator basket and descend down to the bottom surface and prevent any mix from flowing into the folds since the folds are effectively eliminated.

While the invention has been described in conjunction with specific embodiments, it is obvious that certain modifications may be made to the invention without deviating from the scope of the invention.

What is claimed is:

1. A process for assembling an electrochemical cell comprising the steps:
   (a) positioning a first active electrode material inside a container closed at the bottom and open at the top so that the first active electrode material defines a centrally disposed cavity, said container being adapted as the terminal for said first active electrode material;
   (b) preparing a first strip and a second strip of separator material with each strip having a bottom segment with extending walls with each wall being defined by two edges and forming in each edge of at least one strip a notch at the area adjacent the bottom segment of the strip and wherein the area of said bottom segment is approximately the cross-sectional area of the cavity in the first electrode;
   (c) forcing said first strip of separator material and said second strip of separator material into the cavity of the first active electrode material and with the separator conforming to the contour of the cavity of the first electrode material; said first strip being positioned with respect to said second strip so as to form within said first electrode a separator basket with a bottom surface which has effectively no projected folds at the area adjacent the notches at the bottom of the separator basket;
   (d) adding a second active electrode material into the cavity of the separator material; and
   (e) sealing the open end of the container with a cover and wherein at least a portion of the cover is electrically insulated from the container and electrically contacting said second active electrode material thereby said portion being adapted as the terminal for the second active electrode material.

2. The process of claim 1 wherein the notch is a semicircular shaped notch.

3. The process of claim 1 wherein the notch is a triangular shaped notch.

4. The process of claim 1 wherein the notch is a polygonal shaped notch.

5. The process of claim 1 wherein in step (c) an electrically insulating barrier layer is positioned on a surface of at least one of the strips at the bottom surface of the separator basket.

6. The process of claim 1 wherein in step (c) the first strip is forced into the cavity of the first active electrode material and then the second strip is rotated 90° to the original orientation of the first strip and then forced into and upon the first strip.

7. The process of claim 5 wherein the electrically insulating barrier layer is a material selected from the group comprising polypropylene, polyethylene, polyvinyl chloride, asphalt, wax, polyvinylidene chloride, cellophane and nylon.

8. The process of claim 1 wherein the first active electrode material is the cathode and the second active electrode material is the anode.

9. The process of claim 8 wherein the cathode comprises manganese dioxide and the anode comprises zinc.

* * * * *